Dec. 8, 1959   M. W. LAITUR   2,916,087
CUSHION SPRING ASSEMBLIES AND SPRING ELEMENTS THEREOF
Filed Aug. 13, 1956   2 Sheets-Sheet 1

INVENTOR.
Martin W. Laitur
BY
Attorney.

Dec. 8, 1959   M. W. LAITUR   2,916,087
CUSHION SPRING ASSEMBLIES AND SPRING ELEMENTS THEREOF
Filed Aug. 13, 1956   2 Sheets-Sheet 2

INVENTOR.
Martin W. Laitur
BY

United States Patent Office 2,916,087
Patented Dec. 8, 1959

2,916,087

CUSHION SPRING ASSEMBLIES AND SPRING ELEMENTS THEREOF

Martin W. Laitur, Detroit, Mich., assignor to L. A. Young Spring & Wire Corporation, Detroit, Mich.

Application August 13, 1956, Serial No. 603,627

6 Claims. (Cl. 155—179)

This invention relates to improvements in cushion spring assemblies and spring elements thereof.

The main objects of the invention are:

First, to provide a cushion spring assembly including a plurality of spring elements of zigzag or sinuous type in which the load supporting portion is effectively braced or reinforced without materially affecting its general resilience, that is, without producing localized "hard portions."

Second, to provide a structure having these advantages in which the parts are relatively simple and economical to produce and easily and rapidly assembled.

Third, to provide a cushion spring element formed of a continuous strand of wire uniformly bent back and forth in sinuous form from end to end thereof and comprising integral load supporting and strut portions.

Objects relating to details and economies of the invention will appear from the description to follow. The invention is defined in the claims.

A structure which embodies the features of the invention is clearly illustrated in the accompanying drawing, in which.

Figure 1:
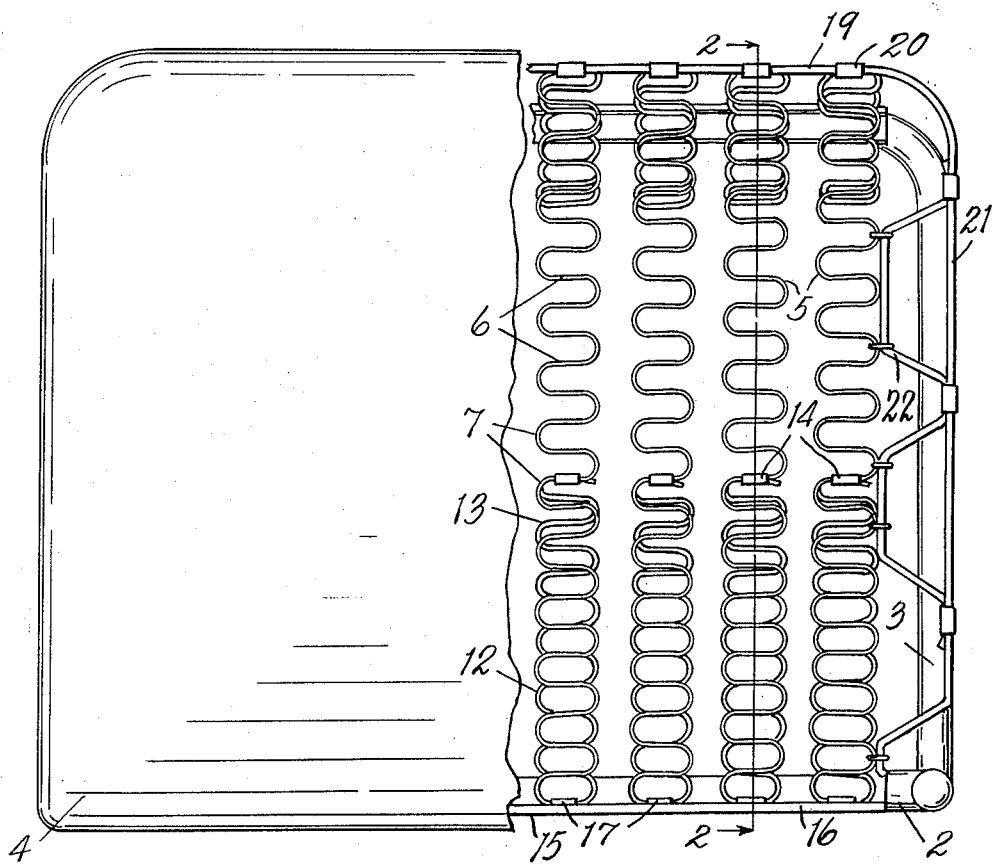
Fig. 1 is a fragmentary plan view of an upholstered seat structure embodying the invention, the upholstery being partially broken away to show structural details.

In the accompanying drawing the invention is illustrated as embodied in an automobile seat structure. The structure includes a base frame having front and rear members 1 and 2 and connecting end portions 3. The base frame is formed of tubular stock. 4 represents the upholstery.

The spring assembly comprises a plurality of spring elements 5 disposed in parallel relation. These spring elements are formed of wire stock bent zigzag or into sinuous form providing a plurality of reaches 6 and connecting bights 7 for the ends thereof. Zigzag or sinuously bent wire springs as such are old in the art.

These spring elements comprise load supporting portions 8, supporting arms 9 at their front ends and reinforcing strut portions 10 at their rear ends. The arms 9 are desirably of general V shape and are fixedly secured at their lower ends to the front members of the base frame. The strut portions 10 are formed by bending or folding the rear end of the load supporting portion upon itself, the strut portions and the load supporting portions having a common reach 11.

The rear portion 12 of the strut is upwardly bowed but diverges downwardly from the load supporting portion. The front end portion 13 of the strut is desirably substantially straight and converges relative to the load supporting portion, being secured thereto by a clip 14, preferably quite closely adjacent to the center of the load supporting portion and in any event in substantially spaced relation to the rear end of the load supporting portion.

Figure 2:
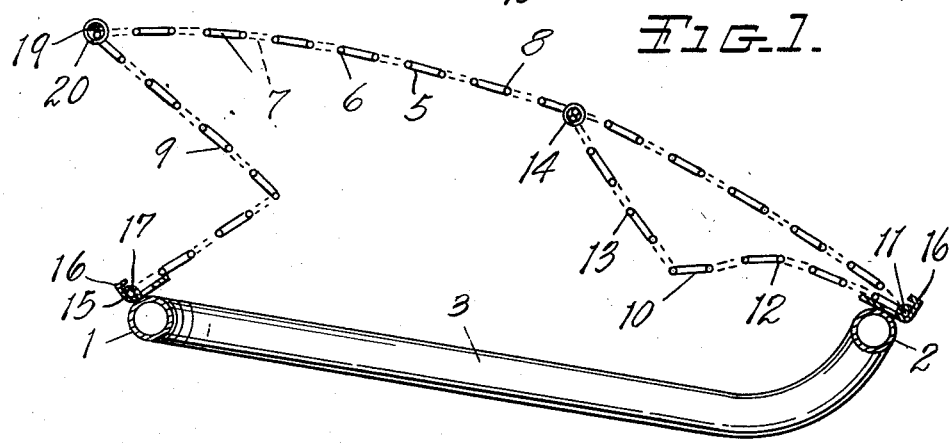
Fig. 2 is a transverse section on a line corresponding to line 2—2 of Fig. 1, the sectioning of the reaches being omitted and the connecting bights at one end thereof being indicated by dotted lines.

The spring elements are attached to the front and rear frame members by means of the attaching strips 15 which are provided at their outer edges with upwardly projecting angled flanges 16 and have tongues 17 struck upwardly therefrom. These strips are fixedly secured to the frame members as by means of spotwelding indicated at 18. It will be noted that both attaching strips are disposed at an angle to the horizontal, the purpose being to provide a fulcruming support for the end loops of the arms 9 and the end loops of the strut portions as illustrated in Figs. 2 and 4.

Figures 3, 4, 5:
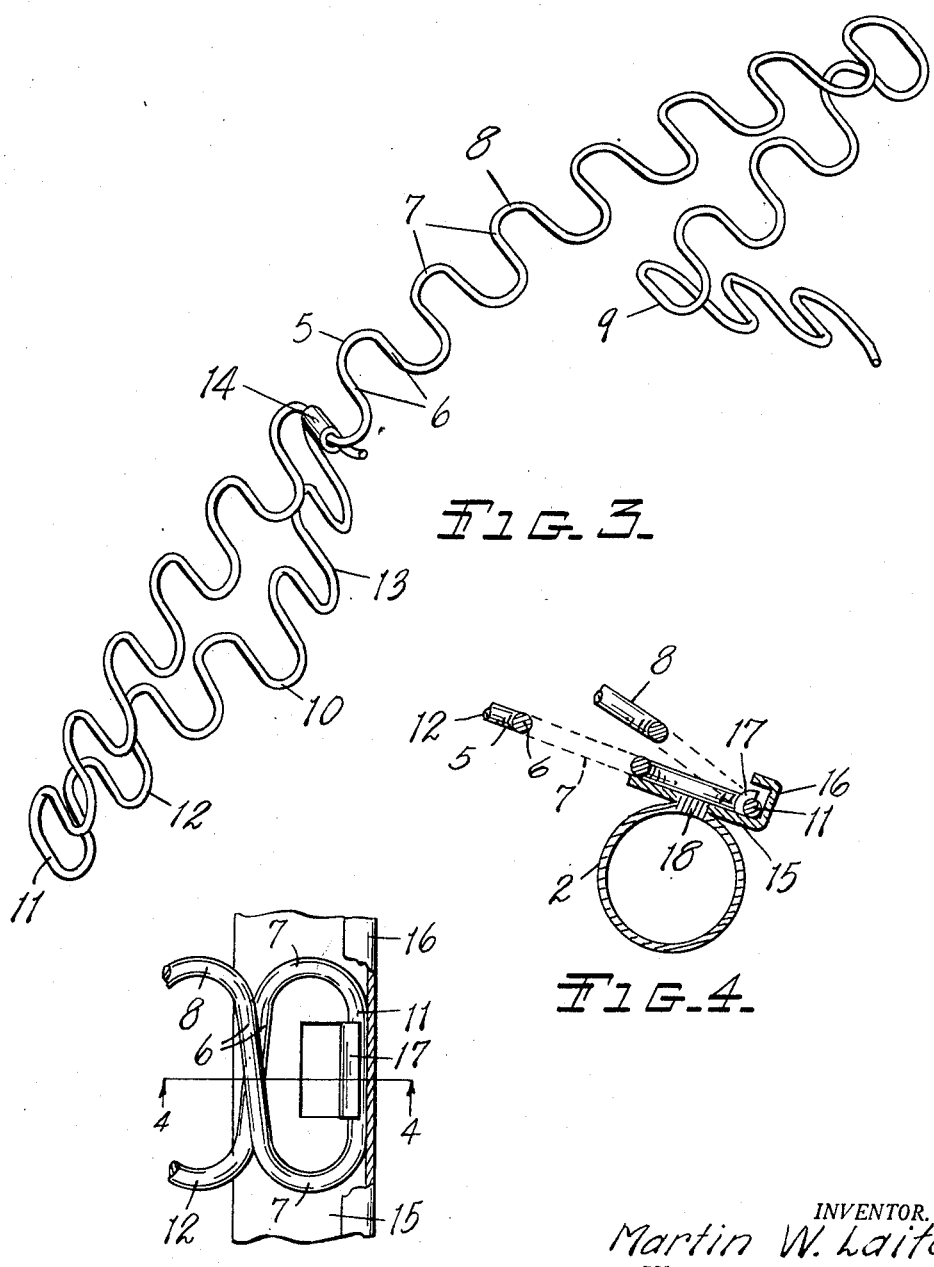
Fig. 3 is a perspective view of one of the spring elements.
Fig. 4 is an enlarged fragmentary view in section on a line corresponding to line 4—4 of Fig. 5 showing details of the connection for the rear ends of the spring elements to the rear frame member.
Fig. 5 is a fragmentary plan view of parts shown in Fig. 4.

The reaches 11 common to both the load supporting portion and the struts are disposed in such engagement with the flanges of the supporting strips that the clamping tongues 17 engage therewith as illustrated in Fig. 4. It will be noted that the strut portions are in fulcruming engagement with the attaching strips while the load supporting portion is in swinging relation thereto. The ends of the arms 9 are secured to the front attaching strips in the same manner and in the same relation thereto as are the strut portions.

By thus forming and mounting the spring element the struts serve to yieldingly reinforce the portions of the spring which are subjected to the heaviest load in use. At the same time there are no localized stiff or "hard" spots or areas.

The spring elements are formed of continuous zigzag or sinuous wire strips and may be quite economically produced and shaped as has been described. They may also be easily mounted. In the preferred embodiment the portion 12 of the strut is upwardly and irregularly arched or bowed and diverges downwardly from the load supporting portion, while the inner portion 13 of the strut is desirably straight.

The front ends of the load supporting portions of the spring elements are connected to a top border wire 19 by the clips 20. This supports the front ends of the spring elements laterally as well as providing a support for the upholstery. The border wire has end portions 21 connected to the end spring elements by means of the struts or braces 22. That detail, however, forms no part of the present invention.

Shaping and arranging the parts as illustrated results in a highly desirable structure. The means illustrated for mounting the spring elements upon the base frame is also highly desirable as it provides an effective support for the spring elements and at the same time the spring elements may be quickly and securely mounted thereon. However, it is desired to point out that the spring elements are adapted for use in other forms of base frames than that illustrated and other means for attachment to the base frame.

It is believed this disclosure will enable those skilled in the art to embody or adapt the invention as may be desired.

Having thus described the invention, what is claimed as new and is desired to be secured by Letters Patent is:

1. A cushion spring element formed of a continuous strand of wire uniformly bent back and forth in sinuous form from end to end thereof and comprising an intermediate upwardly bowed load supporting portion, a downwardly projecting V-shaped supporting arm at one end of said load supporting portion, and an inturned strut portion at the other end of said load supporting portion disposed under said load supporting portion, the load supporting portion and said strut portion having a common terminal reach adapted for attachment to a common support, said strut portion comprising an upwardly bowed downwardly diverging outer end portion and an upwardly and forwardly directed substantially straight inner end portion disposed in converging relation to said load supporting portion and secured thereto centrally thereof, said strut being free intermediate said terminal reach and its connection to said load supporting portion.

2. A cushion spring element formed of a continuous strand of wire uniformly bent back and forth in sinuous form from end to end thereof and comprising an upwardly bowed load supporting portion, and an inturned strut portion at one end of said load supporting portion disposed under said load supporting portion, the load supporting portion and said strut portion comprising an upwardly bowed downwardly diverging outer end portion and an upwardly and forwardly directed substantially straight inner end portion disposed in converging relation to said load supporting portion and secured centrally thereof, said load supporting portion in the rear end of said strut being adapted for attachment to a common support, it being unsupported between its rear end and its connection to said load supporting portion.

3. A cushion spring assembly comprising a base frame including front and rear members, a plurality of spring elements disposed in parallel side by side relation, the spring elements being formed of wire of sinuous form and each comprising an intermediate upwardly bowed load supporting portion, a downwardly projecting V-shaped supporting arm at the front end of said load supporting portion and an inturned strut portion at the rear end of said load supporting portion disposed under said load supporting portion, the load supporting portion and said strut portion having a common terminal reach, said strut portion comprising an upwardly bowed downwardly diverging outer end portion and an upwardly directed substantially straight inner end portion disposed in converging relation to said load supporting portion and secured thereto centrally thereof, spring element attaching strips fixedly secured to said front and rear frame members and having angled upwardly projecting inwardly facing flanges on their outer edges and a plurality of longitudinally spaced tongues struck upwardly therefrom, the ends of said supporting arms being disposed on the attaching strip on said front frame member in end thrust engagement with said flange and with said tongues in retaining engagement therewith, the ends of the tongues being within the flange of the supporting strips, the reaches common to said load supporting and strut portions being disposed on the rear attaching strip in thrust engagement with the flange thereof and with the tongues in retaining engagement with said common reaches, said supporting arms and said strut portions having fulcruming supported engagement with said attaching strips.

4. A cushion spring assembly comprising a base frame including front and rear members, a plurality of spring elements disposed in parallel side by side relation, the spring elements being formed of wire of sinuous form and each comprising an intermediate upwardly bowed load supporting portion, a downwardly projecting supporting arm at the front end of said load supporting portion and an inturned strut portion at the rear end of said load supporting portion disposed under said load supporting portion, the load supporting portion and said strut portion having a common terminal reach, said strut portion comprising a downwardly diverging outer end portion and an upwardly directed inner end portion disposed in converging relation to said load supporting portion and secured thereto centrally thereof, spring element attaching strips fixedly secured to said front and rear frame members and having angled upwardly projecting inwardly facing flanges on their outer edges and a plurality of longitudinally spaced tongues struck upwardly therefrom, the ends of said supporting arms being disposed on the attaching strip on said front frame member in end thrust engagement with said flange and with said tongues in retaining engagement therewith, the ends of the tongues being within the flange of the supporting strips, the reaches common to said load supporting and strut portions being disposed on the rear attaching strip in thrust engagement with the flange thereof and with the tongues in retaining engagement with said common reaches.

5. A cushion spring assembly comprising a base frame including front and rear members, a plurality of spring elements of sinuous form disposed in side by side relation and each comprising an intermediate load supporting portion, an integral supporting arm at the front end of said load supporting portion, an integral return bent strut portion at the rear end of said load supporting portion, said strut portion comprising an outer end portion disposed in diverging relation to said load supporting portion and an inner end portion disposed in converging relation to said load supporting portion, the inner end of said strut portion being secured to the load supporting portion in substantially spaced relation to the front and rear ends thereof, spring element attaching strips fixedly secured to said front and rear frame members and having upwardly projecting flanges on outer edges and a plurality of longitudinally spaced tongues struck upwardly therefrom, the ends of said supporting arms being disposed on the attaching strip on said front frame member in end thrust engagement with said flanges and with said tongues in retaining engagement therewith, the reaches common to said load supporting and strut portions being disposed on the rear attaching strip in thrust engagement with the flange thereof and with the tongues in retaining engagement with said common reaches, said supporting arms and said strut portions having fulcruming supported engagement with said attaching strips.

6. A cushion spring assembly comprising a base frame including front and rear members, a plurality of spring elements of sinuous form disposed in side by side relation and each comprising an intermediate load supporting portion, an integral return bent strut portion at the rear end of said load supporting portion, said strut portion comprising an outer end portion disposed in diverging relation to said load supporting portion and an inner end portion disposed in converging relation to said load supporting portion, the inner end of said strut portion being secured to the load supporting portion in substantially spaced relation to the front and rear ends thereof, spring element attaching strips fixedly secured to said front and rear frame members and having upwardly projecting flanges on outer edges and a plurality of longitudinally spaced tongues struck upwardly therefrom, the ends of said supporting arms being disposed on the attaching strip on said front frame member in end thrust engagement with said flanges and with said tongues in retaining engagement therewith, the reaches common to said load supporting and strut portions being disposed on the rear attaching strip in thrust engagement with the flange thereof and with the tongues in retaining engagement with said common reaches.

References Cited in the file of this patent

UNITED STATES PATENTS

| 2,636,544 | Hickman | Apr. 28, 1953 |
| 2,642,928 | Bateman et al. | June 23, 1953 |
| 2,845,996 | Flint | Aug. 5, 1958 |

FOREIGN PATENTS

| 662,212 | Great Britain | Dec. 5, 1951 |